Jan. 13, 1925.
E. R. GIBBS
SEAT
Filed Jan. 11, 1924
1,522,621
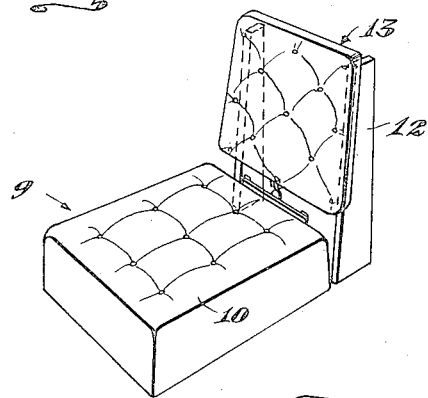
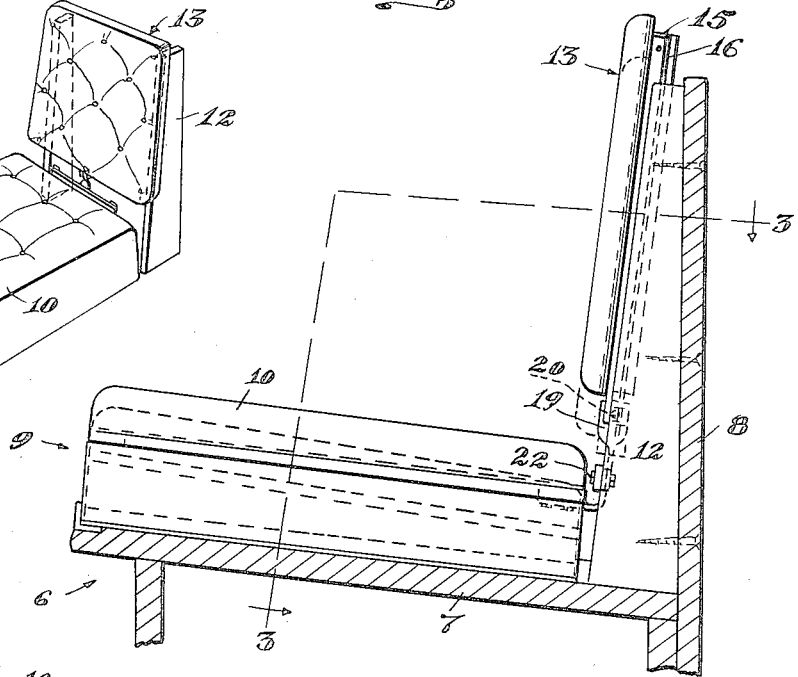
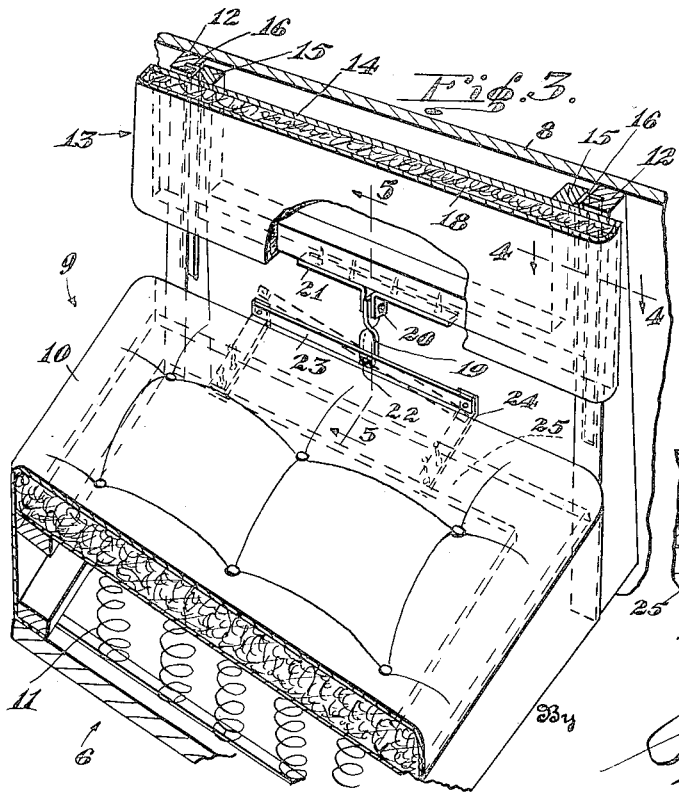
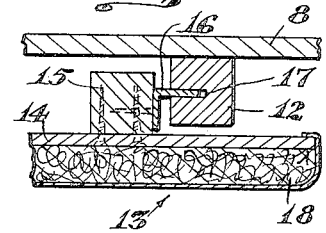
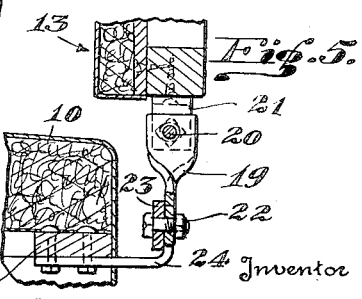
Inventor
EDMOND REA GIBBS.
Attorney Patented Jan. 13, 1925.

1,522,621

UNITED STATES PATENT OFFICE.

EDMOND REA GIBBS, OF HUNTINGTON PARK, CALIFORNIA.

SEAT.

Application filed January 11, 1924. Serial No. 685,707.

*To all whom it may concern:*

Be it known that I, EDMOND REA GIBBS, a citizen of the United States, residing at Huntington Park, in the county of Los Angeles and State of California, have invented new and useful Improvements in Seats, of which the following is a specification.

This invention particularly pertains to a seat for use on motor vehicles and the like.

An object of the invention is to provide a seat which is especially adapted to be employed on motor trucks as a driver's seat, and which is so constructed as to afford comfort to the driver and lessen the fatigue incident to riding in vehicles having stiff spring action.

Another object is to provide a vehicle driver's seat having seat and back portions in which the seat portion is of the spring cushion type and adapted to have vertical movement on spring supports, and also to be capable of having lateral swaying movement; and in which the back portion is mounted to have vertical movement coincident with the corresponding movements of the seat portion.

With the foregoing objects in view, together with such other objects and advantages as may subsequently appear, the invention resides in the parts, and in the construction, combination and arrangement of parts or their equivalents as hereinafter described and claimed, and illustrated, by way of example, in the accompanying drawings, in which—

Figure 1 is a perspective view of the seat, as detached.

Figure 2 is a view of the seat as seen in side elevation, showing it as applied to the seat frame of a motor vehicle, and illustrating the manner in which the seat and back portions are adapted to have vertical movement relative to the seat frame.

Figure 3 is a detail in perspective and section, as seen on the line 3—3 of Figure 2.

Figure 4 is a detail in horizontal section as seen on the line 4—4 of Figure 3.

Figure 5 is a detail in vertical section as seen on the line 5—5 of Figure 3.

More specifically, 6 indicates a seat frame which may be of any suitable construction, such for example, as is commonly employed on motor vehicles and particularly on trucks; the seat frame being shown as comprising a substantially horizontally extending panel 7, and a vertical back panel 8. Mounted on the panel 7 is a spring cushion seat 9 of conventional form comprising a cushion 10 supported on a series of helical springs 11, so as to be capable of vertical movement relative to the seat frame 6 and also be capable of having a lateral swaying or rocking movement.

Mounted on the back panel 8 are suitable guideways 12 on which a seat back member 13 is mounted for vertical movement.

The back member 13 is here shown as embodying a panel 14 having vertical cleats 15 on the back thereof fitted with flanges 16 which slidably engage vertical slots 17 of the guideways 12. The front of the panel 14 may be covered with a cushion 18.

In carrying out my invention the back member 13 is connected to the seat 9 so as to move vertically coincident with vertical movement of the seat. The connection between the back member and the seat is here shown as comprising a link 19 pivotally connected at its upper end by a pivot pin 20 to a yoke 21 secured to the lower edge of the back member 13 intermediate the side edges of the latter. The pivot pin 20 extends in a direction parallel with the front face of the back member 13 so that the link 19 may be rocked in a direction at right angles to the front face of the back member.

The lower end of the link 19 is connected to a pivot pin 22 extending at right angles to the pivot pin 20, which pivot pin is carried by a horizontally extending bar 23 supported on brackets 24 attached to the frame 25 of the seat cushion 10. The pivotal connection between the link 19 and the seat cushion by the pin 22 permits lateral rocking movement of the cushion relative to the back member 13 so as to prevent binding of the back member in its guideways, which would be liable to occur if the link 19 were rigidly connected to the seat cushion, in event a greater load should be imposed on one side of the center of the cushion than on the other. This pivotal connection also permits of such sidewise swaying movement of the cushion as to afford easy riding.

The pivotal connection afforded by the pivot pin 20 between the cushion 10 and the back member 13, permits of forward and backward movement of the cushion relative to the back, and also permits variation of the angular relation of the seat to the back. The combined pivotal action afforded by the pivot pins 20 and 22 and the link 19, together with the vertically slidable mounting of the back member, permits of practically universal movement of the seat cushion on its supporting springs 11 relative to the back member.

The operation of the invention is apparent from the foregoing it being seen that, on imparting vertical movement to the cushion 10, a corresponding motion will be transmitted to the back member 13, which is advantageous in that it obviates relative vertical movement between the back of the person occupying the seat and the back portion of the latter incident to the use of rigid seat backs in conjunction with cushion seats.

While I have shown and described a specific embodiment of the invention, I do not limit myself to the exact details of construction shown, but may employ such modifications in the details of construction and the arrangement of parts as come within the scope of the appended claims.

I claim—

1. In a vehicle seat, a yieldably supported cushion, a back member mounted to slide vertically, and a connection between said cushion and the back member whereby vertical movement of the cushion will effect corresponding movement of the back member; said connection being adapted to permit lateral rocking movement of the cushion relative to the back member.

2. In a vehicle seat, a yieldably supported cushion, a back member mounted to slide vertically, and a link connection between said cushion and back member whereby vertical movement of the cushion will impart a corresponding movement to the back member, said link being pivotally connected to said cushion to permit lateral swaying movement of the cushion relative to the back member.

3. In a vehicle seat, a yieldably supported cushion, a back member mounted to slide vertically, and a link pivotally connected at one end to said back member to swing in a direction extending at right angles to the front face of said back member and pivotally connected at its other end to said cushion to permit lateral swinging movement of the cushion relative to the back member.

4. In a vehicle seat, a cushion, spring supporting said cushion, a back member, guides in which said back member is mounted to slide vertically, a link pivotally connected at one end to said back member to swing on an axis extending parallel with the front face of said back member, and a pivotal connection between the other end of said link and said cushion the axis of which extends at right angles to that of the pivotal connection of the link with the back member.

EDMOND REA GIBBS.